US007962862B2

(12) United States Patent
Kulp et al.

(10) Patent No.: US 7,962,862 B2
(45) Date of Patent: Jun. 14, 2011

(54) METHOD AND DATA PROCESSING SYSTEM FOR PROVIDING AN IMPROVED GRAPHICS DESIGN TOOL

(75) Inventors: Richard L. Kulp, Cary, NC (US); Gili Mendel, Cary, NC (US); Jeffrey D. Myers, Silver Spring, MD (US); Rebecca J. Schaller, Cary, NC (US); Gunturi Srimanth, Raleigh, NC (US); Peter A. Walker, Fuquay-Varina, NC (US); Joseph R. Winchester, Otterbourne (GB)

(73) Assignee: International Business Machines Corporation, Armonk, NY (US)

( * ) Notice: Subject to any disclaimer, the term of this patent is extended or adjusted under 35 U.S.C. 154(b) by 2340 days.

(21) Appl. No.: 10/720,804

(22) Filed: Nov. 24, 2003

(65) Prior Publication Data

US 2005/0114373 A1    May 26, 2005

(51) Int. Cl.
*G06F 3/048* (2006.01)
(52) U.S. Cl. ........ 715/856; 715/764; 715/790; 345/418; 345/629; 345/619

(58) Field of Classification Search .................. 715/856, 715/764, 790; 345/619, 418, 629
See application file for complete search history.

(56) References Cited

U.S. PATENT DOCUMENTS

| 5,377,314 | A | * | 12/1994 | Bates et al. ................... 345/634 |
| 5,627,959 | A | * | 5/1997 | Brown et al. ................. 715/853 |
| 5,651,107 | A | * | 7/1997 | Frank et al. ................... 715/768 |
| 5,754,177 | A | * | 5/1998 | Hama et al. ................... 715/862 |
| 6,335,733 | B1 | * | 1/2002 | Keren et al. ................... 345/418 |

* cited by examiner

*Primary Examiner* — Tuyetlien T Tran

(57) ABSTRACT

A method and software tool for performing an operation on a graphic object in a display of overlapping graphic objects in a data processing system are provided. The method comprises the steps of detecting the position of a pointer on the display; displaying to a user an indication of potential target objects of the operation which coincide with the pointer position; detecting a selection of one of the indicated potential target objects as the target object; and performing the operation on the selected object. In the case where the target object is not the outermost layer of the graphic objects on the display, the method may also comprise temporarily making the selected target object visible during performance of the operation on the target object by making the overlying objects transparent.

28 Claims, 8 Drawing Sheets

METHOD AND DATA PROCESSING SYSTEM FOR PROVIDING AN IMPROVED GRAPHICS DESIGN TOOL

BACKGROUND OF THE INVENTION

The present invention relates to data processing systems and in particular to a tool for creating a graphical design or graphical user interface.

A designer may use a data processing system to create a graphical design comprising a plurality of graphic objects. The user is provided with a display and a user input to allow manipulation and creation of graphic objects on the display. Typically, a user is provided with a cursor control device, such as a mouse, enabling the user to control one or more cursors on the display. To manipulate the design, the user may select an operation such as a manipulation tool, and then select an object to be the target object to which the manipulation tool is to be applied, typically this is done by loading the cursor with the manipulation tool, usually by clicking on an icon representing the tool, and then applying the tool to the target object.

Often multiple graphic objects may be arranged and simultaneously displayed such that portions of some of the graphic objects overlap and obscure portions of other graphic objects. Sometimes a user will wish to drop a tool onto an object which is wholly obscured by other layers. In this case the user must generally rearrange the order in which the objects are displayed so that at least a portion of the desired graphic object appears before the manipulation can be made.

Typically, this is done by the user selecting a tool for sending successive layers of objects to the back of the arrangement or bringing successive layers to the front, thereby scrolling through the different layers one by one until the desired target object is on top. The user can then select and drop the source object onto the target object as described above. The user must then rearrange the objects to return them to their original order.

In another method of rearranging the layers, the user is presented with a tree showing the containment hierarchy of the objects which allows the user to select the object of interest, which will then appear on the display. However, the selected object is often drawn at a default size and location and must then be resized and relocated by the user, which is not convenient.

Another method is described in IBM's U.S. Pat. No. 5,377,314. In this method a user selects a particular area of the screen, and is then able to scroll through only those graphic objects which are at least partially displayed within the selected area of the screen. This reduces the number of objects which are scrolled through and speeds up the selection of the desired target object. When an object is selected it becomes the outermost layer. The user can later request that the objects be returned to their original layer order.

There is still a need however for an improved method of manipulating objects that may be obscured by overlying layers.

SUMMARY OF THE INVENTION

According to a first aspect of the invention, there is provided a method for performing an operation on a graphic object in a display of overlapping graphic objects in a data processing system. The method comprises the steps of detecting the position of a pointer on the display; displaying to a user an indication of potential target objects of the operation which coincide with the pointer position; detecting a selection of one of the indicated potential target objects as the target object; and performing the operation on the selected object.

The method may further comprise the step of selecting an operation to be performed on the target object. The operation may be the manipulation of the target object such as a rotation, resizing or filling operation.

In the case where the target object is not the outermost layer, the method may also comprise temporarily making the selected target object visible during performance of the operation on the target object. Preferably this is done by making the overlying objects transparent. Thus embodiments of the invention avoid the need to rearrange the layers of the objects and achieve manipulation of an obscured object in a single mouse operation.

According to another aspect of the invention, there is provided a software tool for performing an operation on a graphic object in a display of overlapping graphic objects in a data processing system. The software tool is operable to detect the position of a pointer on the display; display to a user an indication of potential target objects of the operation which coincide with the pointer position; detect a selection of one of the indicated potential target objects as the target object; and perform the operation on the selected object.

BRIEF DESCRIPTION OF THE DRAWINGS

Embodiments of the present invention will now be described by way of example only, with reference to the accompanying drawings where like numerals refer to like parts and in which.

DESCRIPTION OF PARTICULAR EMBODIMENTS

Figure 1:
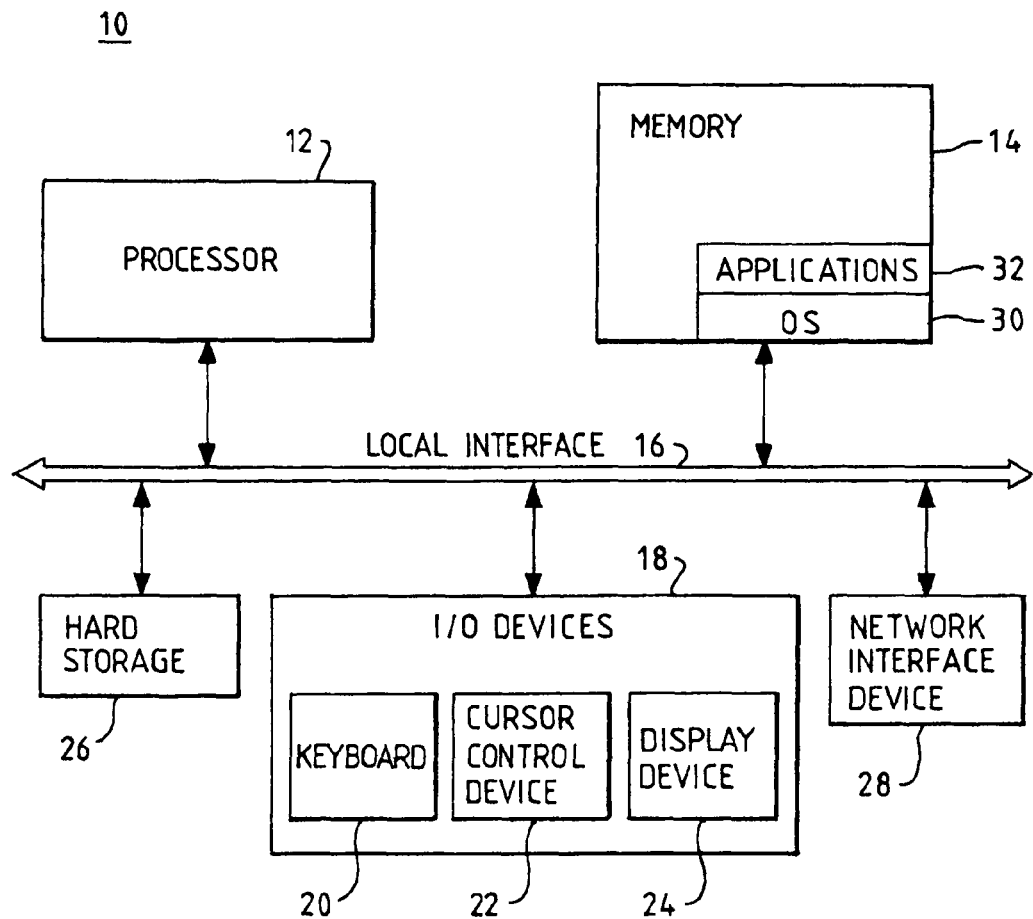
FIG. 1 shows a schematic representation of a data processing system according to an embodiment of the present invention.

Referring to FIG. 1, there is shown a schematic and simplified representation of an illustrative implementation of a data processing system 10. As shown in FIG. 1, the data processing system comprises a processor (CPU) 12, and memory 14 coupled to a local interface 16. One or more user-input devices 18, such as a keyboard 20, cursor control device 22 and display device 24 are connected to the local interface 16. Additionally, hard storage 26 and a network interface device 28 are provided.

Illustrated within memory 14 in FIG. 1, are operating system (OS) 30 and applications 32 which are currently being run on the data processing system 10. The OS is a software (or firmware) component of the data processing system 10 which provides an environment for the execution of programs by providing specific services to the programs including loading the programs into memory and running the programs. The OS also manages the sharing of internal memory among multiple applications and/or processes and handles input and output control, file and data management, communication control and related services. Application programs make requests for services to the OS through an application program interface (not shown).

The data processing system 10 may comprise, for example, a personal computer (PC), laptop, server, workstation, or a portable computing device, such as a personal digital assistant (PDA), mobile telephone or the like. Furthermore, data processing system 10 may comprise additional components not illustrated in FIG. 1, and, in other embodiments, may not include all of the components illustrated in FIG. 1.

Referring again to FIG. 1, the various components of data processing system 10 will be described. The processor 12 may be a hardware device for executing software located in memory 14, and may be any custom made or commercially available processor, a central processing unit (CPU), a semiconductor based microprocessor, a macroprocessor, or generally any device for executing software instructions.

Memory 14 may include any one or combination of volatile memory elements (e.g., random access memory (RAM, such as DRAM, SRAM, SDRAM, etc.)) and non-volatile memory elements (e.g., ROM, hard drive, tape, CDROM, DVDROM etc.). Memory 14 may incorporate electronic, magnetic, optical, and/or other types of storage media. Memory 14 may also have a distributed architecture, with various components being situated remote from one another, but being accessible by the processor 12.

Local interface 16 may be, for example, one or more buses or other wired or wireless connections and may comprise additional elements which are omitted for simplicity, such as controllers, buffers (caches), drivers, repeaters, and receivers. Further, local interface 16 may include address, control, and/or data connections to enable appropriate communications among components of the data processing system 10.

Input/output (I/O) devices 18 may comprise any device configured to communicate with local interface 16. In FIG. 1, a keyboard 20, cursor control device 22 and display device 24 are shown. Additional input/output devices such as optical drives, floppy disk drives, cameras, I/O ports, printers, speakers, microphones, scanners, etc. could also be provided.

Cursor control device 22 may comprise any input device configured to cooperate with an application 32 and/or OS 30 and manipulate one or more cursor(s) displayed on the display device 24. For example, cursor control device 22 may comprise, but is not limited to: a mouse, a trackball, a set of navigation keys (e.g., arrow keys), a touchpad, a joystick or a touch sensitive screen.

Network interface device 28 may be any device configured to interface between the data processing system 10 and a computer or telecommunications network, such as a Local Area Network (LAN), a private computer network, a public or private packet-switched or other data network including the Internet, a circuit switched network, or a wireless network.

A computer program for implementing various functions or for conveying information may be supplied on carrier media such as one or more DVD/CD-ROMs 46, floppy disks 48, and/or USB storage devices and then stored on a hard disk, for example. The data processing system shown in FIG. 1 may be connected to a network such as the Internet, or a local or wide area dedicated or private network, for example, via the network interface device 28.

A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fibre link or any other suitable carrier medium for a telecommunications system.

Figure 2:
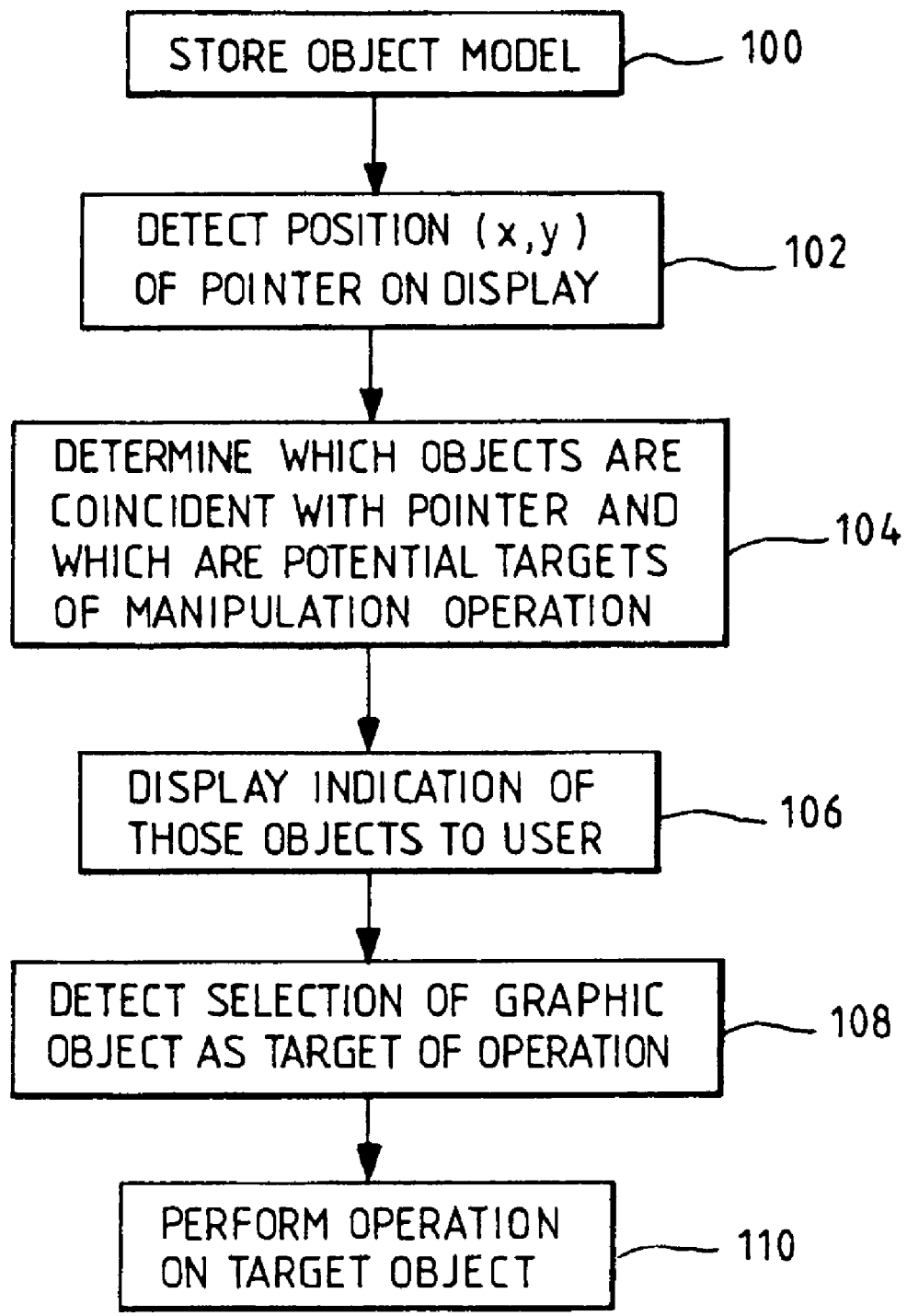
FIG. 2 shows a flowchart of a method of manipulating a graphic object according to an embodiment of the invention.

Referring to FIG. 2, a method of manipulating graphic objects using a design tool in accordance with an embodiment of the invention will now be described. The design tool is an application 32 running on the data processing system 10. The design tool allows a user to create and manipulate graphic objects on a display. The design tool stores 100 an object model which includes attributes of each of the various graphic objects in a design, such as their position on the screen, and displays the graphic objects on a display. To manipulate a particular one of these graphic objects a user moves a pointer on the display to a position over the target object. The design tool detects 102 the position of the pointer, determines 104 which objects lie underneath the detected position of the pointer, that is are coincident with the pointer position, and which are also potential targets of the manipulation operation, and displays 106 a list of these to the user. The user then selects 108 an object from the list to be the target of the manipulation operation and the operation is then carried out 110 on the target object.

Figure 3:
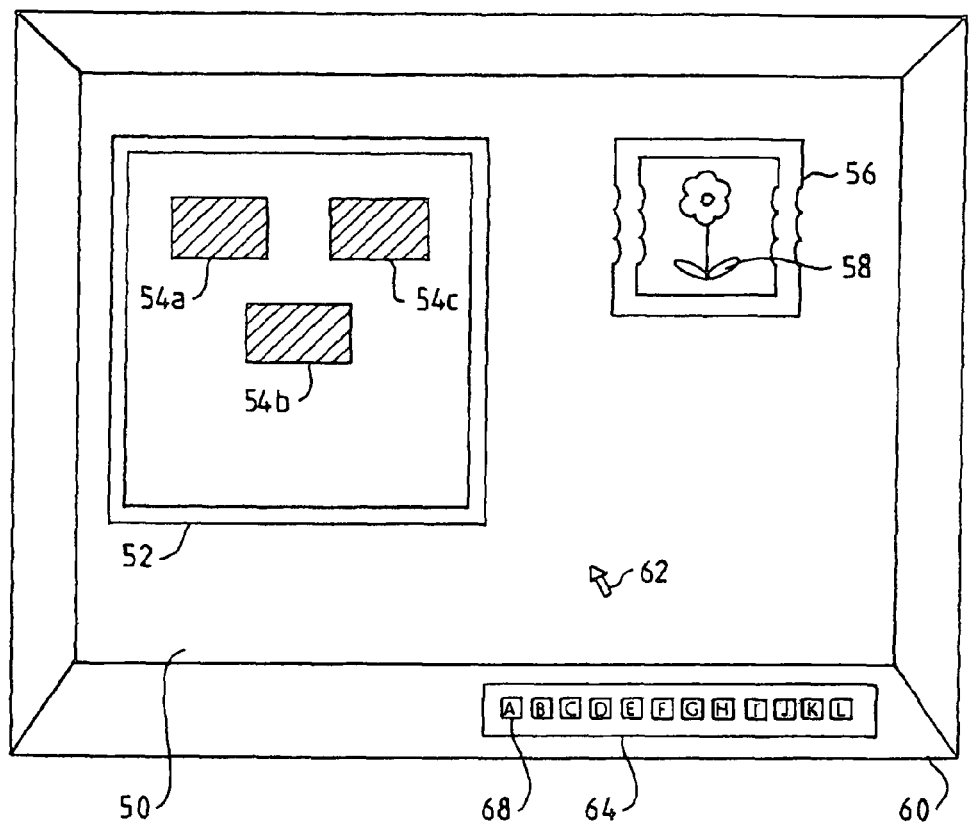
FIG. 3 shows multiple graphic objects on a display screen according to an embodiment of the invention.

Referring to FIG. 3, there are depicted multiple graphic objects, such as a wall 50, blackboard 52, postcards 54a, 54b, 54c, and picture 56, displayed on a screen 60, created using the design tool. As illustrated, certain of the graphic objects overlap. For example, postcards 54a, 54b and 54c overlap blackboard 52, which in turn overlaps wall 50. Picture 56 also overlaps wall 50. Postcards 54a, 54b, and 54c are 'children' to a parent object, namely the blackboard 52, and their positions relative to the blackboard, rather than relative to the wall, are stored. Thus if the user were to relocate the blackboard, the postcards would move with it. Similarly, flower 58 is a child of the picture 56, and both picture 56 and blackboard 52 are children of the wall 50.

The user is provided with a mouse for controlling a mouse pointer cursor 62 on the screen 60. The design tool includes a plurality of manipulation tools which are represented on the screen by a plurality of icons 68 on a palette or toolbar 64 and which may be used to select particular manipulation operations by clicking a control button when the mouse pointer is located over the relevant icon 68. In FIG. 3, these icons have been labeled A-L. When an operation has been selected the mouse pointer cursor 62 is said to be 'loaded' with the operation and the form of the mouse pointer cursor usually changes to indicate to the user that the cursor is loaded. For example, if the operation is a painting operation, the mouse pointer cursor may change from an arrow to a paintbrush. The user may then perform the selected operation on the target object. Alternatively, the mouse pointer cursor may be automatically loaded with a particular default tool without the user performing a selection.

Figure 4A:
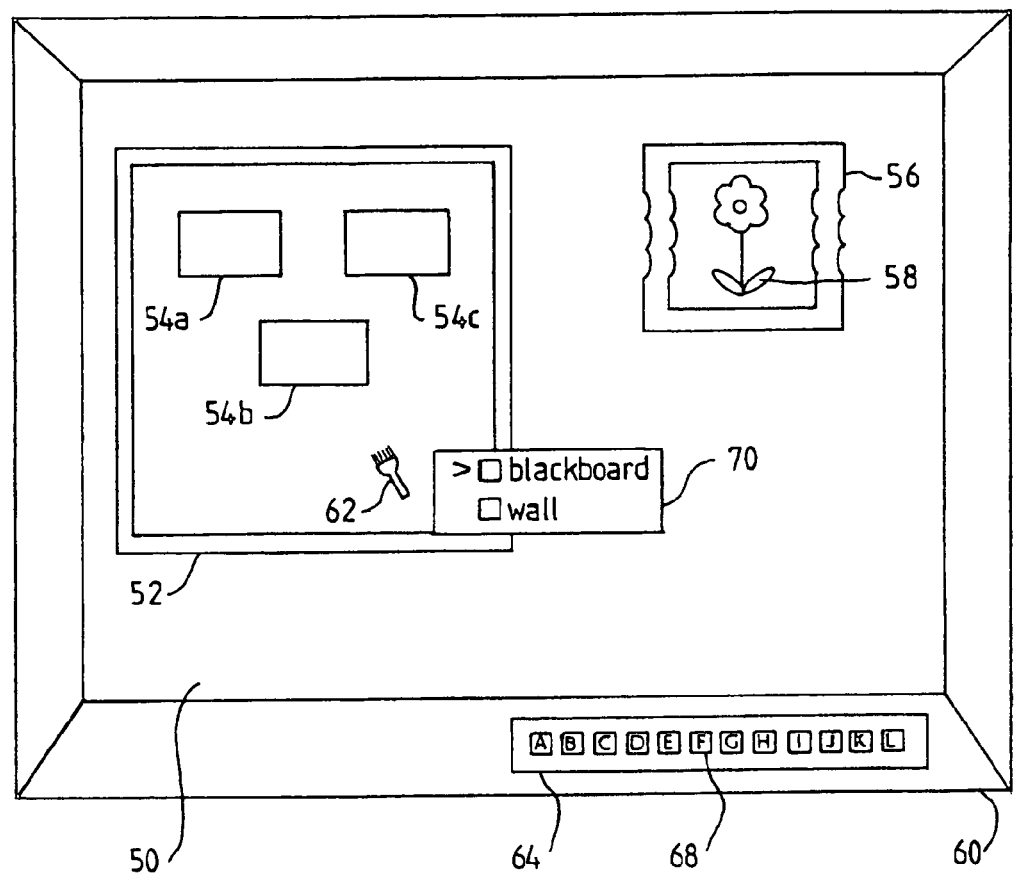
FIGS. 4a and 4b show screen shots presented to a user during manipulation of a graphic object in accordance with an embodiment of the invention.

If the user wishes to apply paint to the wall 50 the user moves the mouse pointer 62, loaded with the paint tool, as shown in FIG. 4a, to the location on the wall where the user wishes to paint. The user typically begins to paint by holding down a mouse button and moving the mouse pointer cursor to apply paint to the wall. When the mouse pointer moves over an area where there is more than one layer, for example over the blackboard 52, the user is presented with a hover window 70 listing the objects coinciding with the pointer location on which the paint operation could be performed, in this case the wall and the blackboard are listed. The user can then select either the wall or the blackboard to be the target of the paint operation by selecting one of the items in the list. The selection, including moving through the list in the hover window 70, is preferably achieved using mouse buttons or keyboard strokes, that is, without moving the mouse pointer position.

Figure 4B:
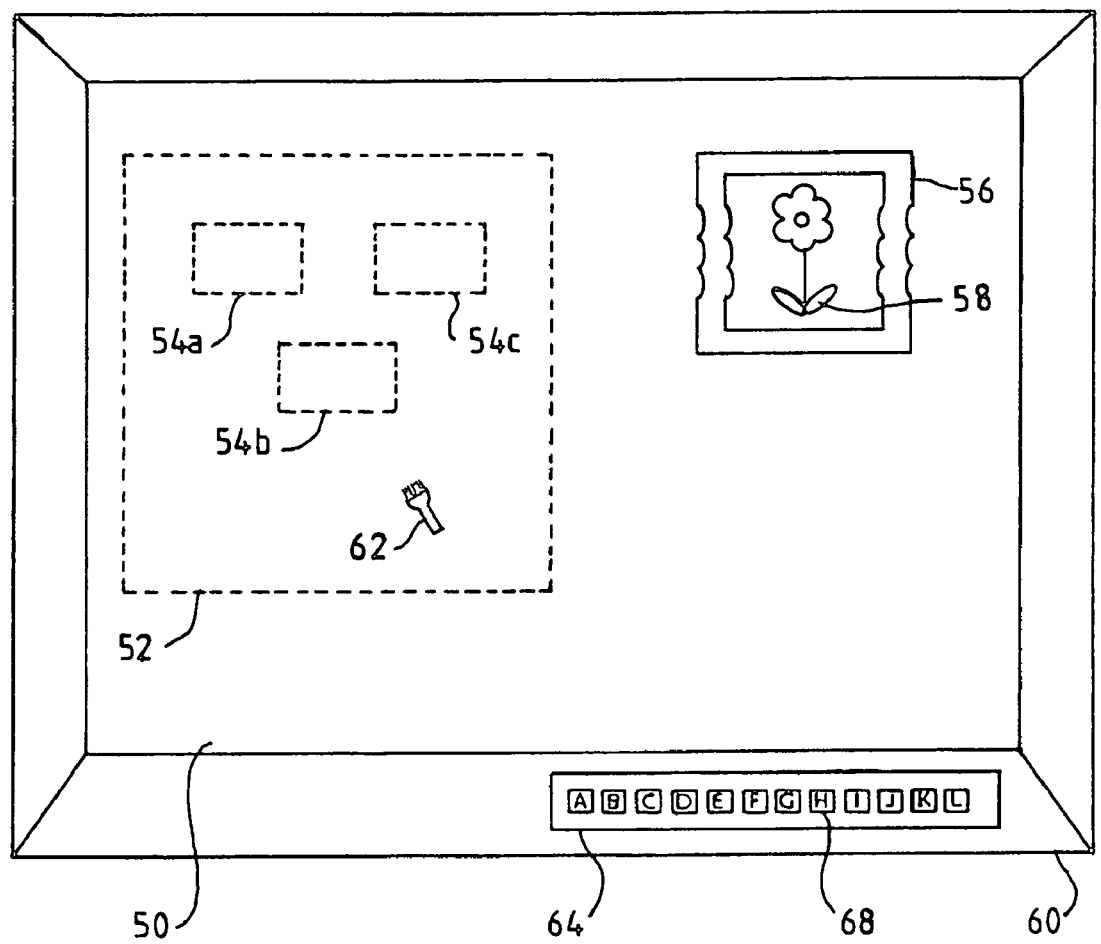

When a selection has been made paint will be applied to the selected object when the painting operation continues. If the wall has been selected, the blackboard 52 (as well as its children, the postcards 54) is temporarily made transparent 114 whilst the paint operation is being carried out, with only an outline of the blackboard and of the postcards remaining visible, as shown in FIG. 4b. When the painting operation ends, and the paint tool is unloaded from the mouse pointer cursor 62, the blackboard and postcards come back into view and the mouse pointer cursor returns to its original form.

Other source objects or tools are applied without dragging the tool around over the target object. Preferably the hover window showing a list of potential target objects only appears after the mouse pointer cursor has been stationary in a particular location for a certain period of time, such as one second. Once a selection from the hover window is made by the user, the hover window disappears, but may reappear if the mouse again becomes stationary for the certain period of time. In a modification, the hover window is always open and follows the movement of the mouse, being updated upon any movement of the mouse without the time delay.

Figure 5A:
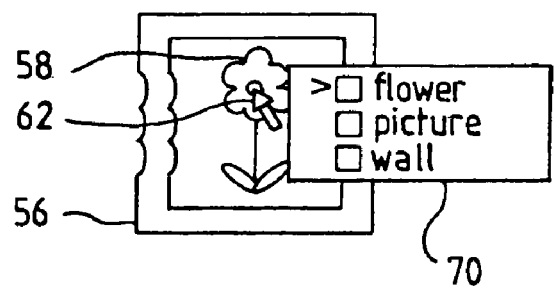
FIGS. 5a, 5b and 5c show a portion of the display screen of FIGS. 3, 4a and 4b and illustrate the manipulation of graphic objects in accordance with an embodiment of the invention.
Figure 5B:
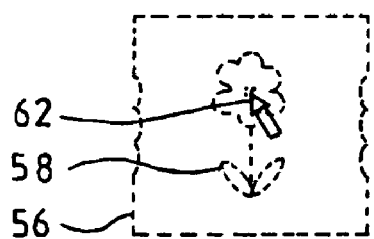

The user may wish to perform an operation which comprises dropping a source object onto a target object, for example to add an image to the design, such as adding an image of a picture hook on the wall underneath the picture. To do this the user selects an image of a picture hook as the source object, thereby loading the mouse pointer cursor with the picture hook and then moves the cursor to the position on the wall where the picture hook object is to be placed, as shown in FIG. 5a. After the mouse pointer has been stationary in that location for one second, a hover window 70 appears showing that there are three objects potential target objects, namely the flower 58, picture 56 and wall 50. The user then moves the arrow in the hover window using a mouse wheel or keyboard strokes to point to the wall entry and then presses a control button such as a mouse button to select the wall. The flower 58, as it is the outermost object at the location of the mouse pointer, then becomes transparent, along with its parent, the picture 56, leaving only an outline to indicate their location on the display, as shown in FIG. 5b. The user may then apply the image of the picture hook to the wall, typically by again clicking a control button. The flower then becomes visible once again, obscuring the new picture hook.

Another operation that may be performed is changing the colour of a target object. To change the colour of the picture hook, for example, a user would select the required colour from a colour tool on the palette, thereby loading the cursor with that colour; move the cursor to the location of the obscured picture hook; and wait until the hover window appeared. The hover window would now list the flower, picture, picture hook and wall and the user could select the picture hook. Again the flower and picture will become transparent temporarily whilst the colour is applied to the hook.

Figure 5C:
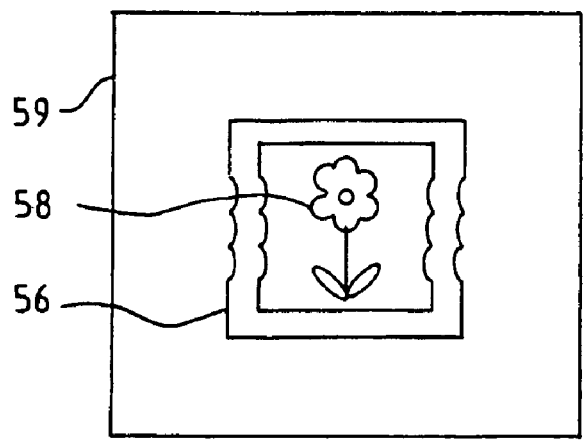

If, instead of a picture hook, the source object selected is a poster 59 which is larger than the picture 56, when it has been applied under the picture on the wall, in a similar manner to the application of the picture hook described above, the parts of the poster which are not covered by the picture will remain visible, as shown in FIG. 5c.

Another manipulation operation may be adding text. To add writing on the blackboard under one of the postcards, the user loads the mouse pointer cursor with the text tool. The user then moves the mouse pointer cursor to the location where the text is to be added to the blackboard, say under postcard 54a. After the mouse remains motionless for one second, a hover window will appear listing the postcard 54a, blackboard 52 and wall 50, and the user then selects the blackboard. The postcard 54a then becomes transparent and the user is able to open a text box on the blackboard. The user can then add text to the box using the keyboard. The text box will show a text insertion cursor to display the location in the text where new text will be inserted. The text insertion cursor is typically moved using navigation keys on the keyboard. When the user has finished inserting text, the user indicates the end of the text operation, typically by moving the mouse pointer cursor to a position outside the text box and clicking a control button. The postcard 54a will then become visible once again.

Typically, each object is given a Z-value which indicates where each object appears in a virtual Z-axis perpendicular to the display screen, that is, its so-called 'Z-order' which determines whether an item would overlap or underlie another if they were moved together. The design tool stores this Z-value as one of the attributes of each object and uses this Z-order to determine the outermost object coincident with the position of the mouse pointer cursor. The object model stored by the design tool will also indicate which objects are 'related' and what type of object they are. Thus the design tool can determine whether the outermost object is a child of another object which is also coincident with the pointer position, for example the flower and its parent the picture in the picture hook examples above.

Figure 6:
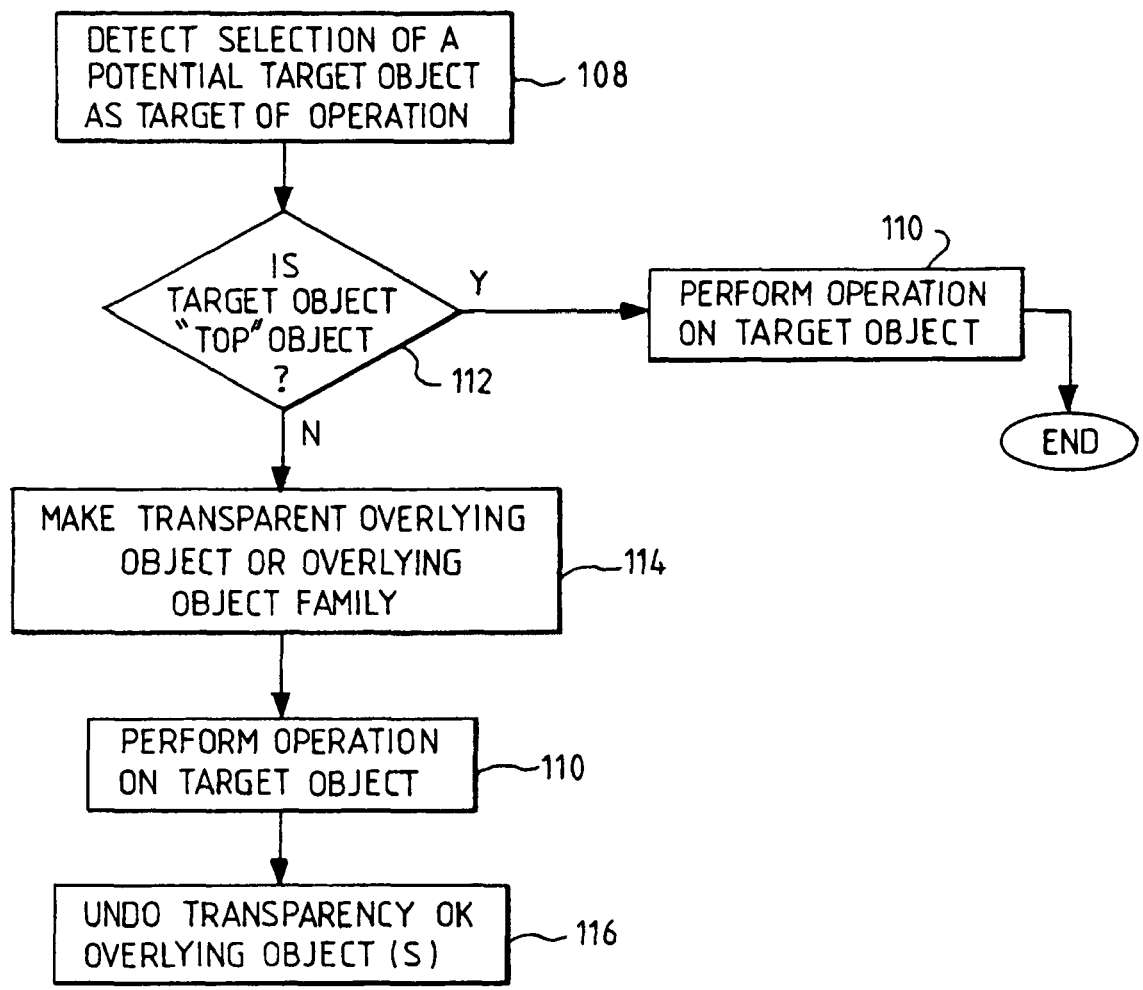
FIG. 6 shows a flowchart of the steps taken after detection of a selection of a target object according to one embodiment of the invention.

Referring to FIG. 6, the steps taken after detection of a selection of a target object, include determining 112 whether the selected target object is the outermost object. If it is then the operation will simply be performed 110 on that target object. If it is determined that the target object is not the outermost layer at the pointer position, the tool makes 114 the overlying objects transparent, typically leaving an outline of each of the overlying objects. This step makes the overlying objects both visually transparent, so that the user can see the target object, as well as functionally transparent, so that the operation is performed on the target object, rather than on an overlying object. Typically, if the outermost object coincident with the pointer is a child of another object which is also coincident with the pointer and also overlays the target object, then both the child and its parent will be made transparent. In the example of the blackboard 52 of FIG. 3, if the mouse pointer is positioned over a postcard 54 and the user selects the wall as the target of the operation, the blackboard and all three postcards 54a, 54b and 54c would be made transparent allowing the user to see the wall. Once the operation has been performed 110 on the target object, the transparency of the overlying objects is automatically undone 116, so that they once again become visible.

Figure 7:
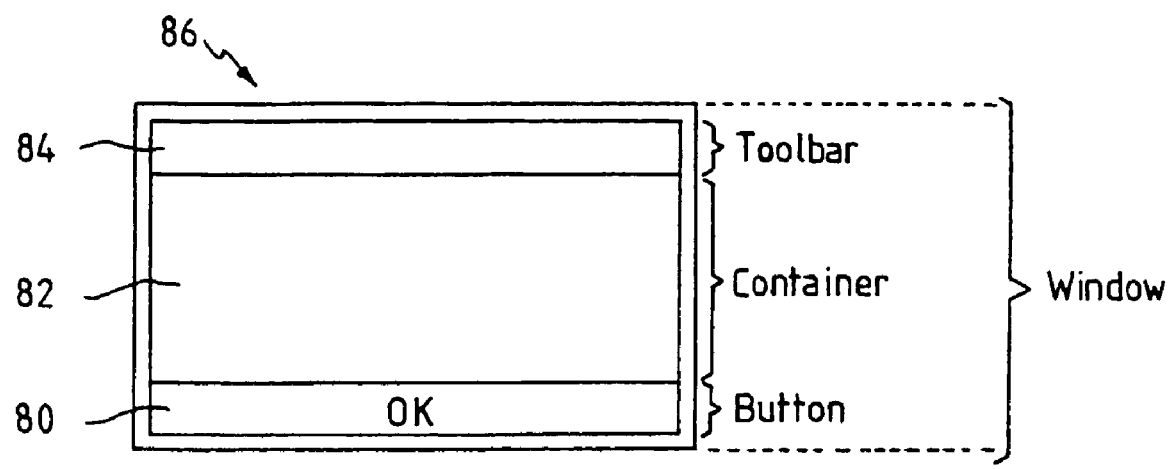
FIG. 7 shows a graphical user interface according to another embodiment of the invention.

The design tool uses the object model to determine which objects are coincident with the pointer position and which of those are potential targets of the operation to be performed. Some objects may be unable to accept certain operations, for example control buttons may be unable to accept a source object being dropped onto them. This will be explained further with reference to FIG. 7, which shows a graphical user interface, created using a design tool according to an embodiment of the invention, and comprising three graphic objects: a top level window 86, which contains three children, a toolbar 84, a container 82 and a button 80. An attribute of the button 80 is that it cannot accept children, thus it is not possible to drop an image or icon onto the button. If a drop operation has been selected and the pointer lies over the button, the button will not appear in the hover window indication of potential target objects.

Figure 8:
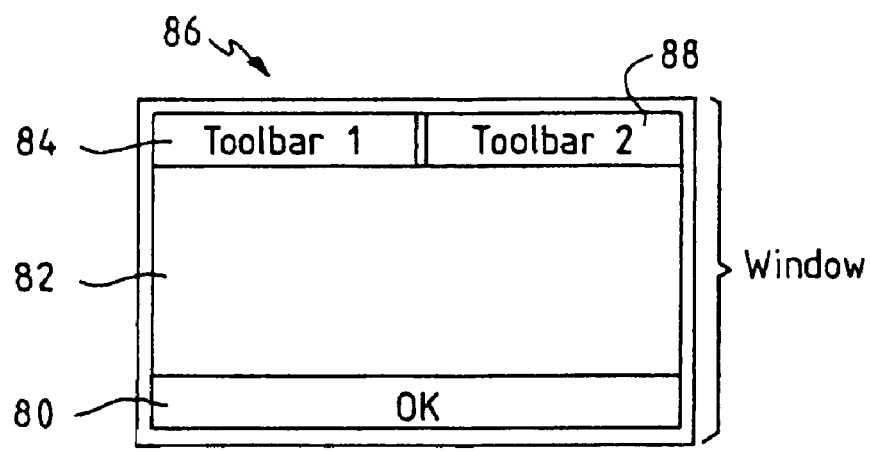
FIG. 8 shows a modified graphical user interface according to once embodiment of the invention.

If an operation to add another toolbar is selected, the user can choose to add the toolbar as a child of the container or as a child of the window. In one example, the user can move the pointer over the existing toolbar 84 and add the new toolbar 88 as a child of the window underneath the existing toolbar, by selecting the window from the hover window. During the operation the window's children become transparent and the design tool blocks the children from receiving mouse events and from being the target of the operation. When the mouse button is released or clicked to perform the operation, the new toolbar 88 may appear at the side of a compact form of the original toolbar 84, as shown in FIG. 8. Other operations that may be performed include the addition of one or more tabbed pages to a window to create a tab folder.

The present invention can be used in many different applications, as will be well understood by those skilled in the art. Examples include tools for creating and manipulating graphical user interfaces, such as web site design tools, and tools for designing pictures, maps, architectural drawings etc.

For example, in an alternative embodiment the operation could be an event from a pointing device. In this embodiment the user moves a pointer, using the pointing device, on the display to a position over a target object and initiates an event from the pointing device, for example a right-click event from a mouse pointer device. The design tool detects the position of the pointer, determines which objects lie underneath the detected position of the pointer, that is are coincident with the pointer position, and which are also potential targets of the manipulation event, and displays a list of these to the user. The user then selects an object from the list to be the target of the event which is then carried out on the target object. For example the event could result in a list of further operations to perform on the target object being presented.

The mouse pointer cursor may be used to select a single point of the display, an area of a certain size, or a user-defined region of the display. For example, a user-defined region may be selected by utilizing a marquee selection, which allows a user to draw a rectangle on the display using a pointing device. The hover window will appear indicating all the graphic objects which coincide with the user-defined region.

Insofar as embodiments of the invention described are implementable, at least in part, using a software-controlled programmable processing device or, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims, is not to be construed as meaning "consisting only of".

What is claimed is:

1. A method for performing an operation on a graphic object in a display of overlapping graphic objects in a data processing system, the method comprising the steps of:
   storing a model of a graphic object, wherein said model includes an indication of whether said graphic object is a parent or child of another graphic object;
   displaying a plurality of overlapping graphic objects to a user;
   detecting a selection by the user of a graphics editing operation to be performed on a graphic object;
   detecting a position of a pointer with respect to a display of said plurality of overlapping graphic objects;
   displaying to a user a list of overlapping graphic objects which coincide with said pointer position and on which said graphics editing operation can be performed;
   detecting a selection by the user of one graphic object of said indicated plurality of overlapping graphic objects as a target graphic object without the user changing said pointer position to make said selection;
   performing said graphics editing operation on said target graphic object; and
   making said target graphic object visible during performance of the graphics editing operation on said target graphic object.

2. The method of claim 1, wherein said position of a pointer comprises a user-defined area of said display described by the motion of said pointer in response to said user dragging an input device.

3. The method of claim 1, wherein said step of selecting the graphics editing operation comprises detecting a user input identifying selection of a graphics editing tool.

4. The method of claim 3, further comprising the step of changing the form of said pointer on said display in response to detection of said user input selection.

5. The method of claim 1, wherein said step of selecting the graphics editing operation to be performed comprises selecting a source graphic object and said step of performing the graphics editing operation comprises dropping said source graphic object onto said target graphic object.

6. The method of claim 1, further comprising the step of storing the positions of said plurality of overlapping graphic objects on said display and comparing said pointer position with said graphic object positions to determine which graphic objects are coincident with the pointer.

7. The method of claim 1, further comprising the step of maintaining a record of attributes relating to each of said graphic objects.

8. The method of claim 1, wherein said displaying step comprises continuously displaying to the user a hover window listing said graphic objects which are coincident with said pointer position and continuously updating said hover window in response to changes in said pointer position.

9. The method of claim 1, wherein said graphics editing operation comprises adding text to said target object.

10. The method of claim 9, wherein said graphics editing operation further comprises the steps of:
opening a text box on said target graphic object;
displaying a text insertion cursor in said text box to display the location where new text will be inserted; and
ending said graphic operation in response to the user moving said pointer to a position outside of said text box and depressing a control button on an input device.

11. The method of claim 1, further comprising the step of determining whether said target graphic object is the outermost one of said graphic objects which are coincident with the position of the pointer.

12. The method of claim 11, wherein the step of making said target graphic object visible comprises temporarily making at least the outermost one of said coincident graphic objects transparent.

13. The method of claim 12, wherein the outermost coincident graphic object is a child graphic object to a parent graphic object and the step of making the selected target graphic object visible comprises temporarily making said parent graphic object transparent in response to making said child graphic object transparent.

14. The method of claim 12, wherein said outermost one of the coincident graphic objects reappears automatically after the graphics editing operation has been performed on said target graphic object.

15. The method of claim 1, wherein said step of displaying a list of overlapping graphic objects is dependent on said position of the pointer remaining the same for a certain period of time.

16. A tangible computer-readable medium comprising a computer program element including computer program instructions to implement the method of claim 1, said tangible computer-readable medium comprising one or more of the following set of media: a magnetic disk or tape, solid-state memory, a compact disk and a digital versatile disk.

17. A data processing system comprising a processor and a memory having stored thereon a software tool for performing a graphics editing operation on a graphic object in a display of overlapping graphic objects in a data processing system, the software tool being operable to cause control circuitry within said data processing system to:
store a model of a graphic object, wherein said model includes an indication of whether said graphic object is a parent or child of another graphic object;
display a plurality of overlapping graphic objects to a user;
detect a selection by the user of a graphics editing operation to be performed on a graphic object;
detect a position of a pointer with respect to a display of said plurality of overlapping graphic objects;
display to a user a list of overlapping graphic objects which coincide with said pointer position and on which said graphics editing operation can be performed;
detect a selection by the user of one graphic object of said indicated plurality of overlapping graphic objects as a target graphic object without the user changing said pointer position to make said selection;
perform the graphics manipulation operation on said target graphic object; and
make said target graphic object visible during performance of the graphics editing operation on said target graphic object.

18. The data processing system of claim 17, wherein said position of a pointer comprises a user-defined area of said display described by the motion of said pointer in response to said user dragging an input device.

19. The data processing system of claim 17, operable to change the form of said pointer on said display in response to detection of said user input selection.

20. The data processing system of claim 17, operable to select a source object and drop said source object onto said target graphic object.

21. The data processing system of claim 17, operable to store the positions of said plurality of overlapping graphic objects on said display and compare said pointer position with said graphic object positions to determine which graphic objects are coincident with the pointer.

22. The data processing system of claim 17, operable to maintain a record of attributes relating to each of said graphic objects.

23. The data processing system of claim 17, operable to continuously display to the user a hover window listing said graphic objects which are coincident with said pointer position and continuously updating said hover window in response to changes in said pointer position.

24. The data processing system of claim 17, wherein said graphics editing operation comprises adding text to said target object.

25. The data processing system of claim 24, wherein said graphics editing operation further comprises the steps of:
opening a text box on said target graphic object;
displaying a text insertion cursor in said text box to display the location where new text will be inserted; and
ending said graphic operation in response to the user moving said pointer to a position outside of said text box and depressing a control button on an input device.

26. The data processing system of claim 17, operable to determine whether said target graphic object is the outermost one of said graphic objects which are coincident with the position of the pointer.

27. The data processing system of claim 25, operable to make at least the outermost one of said coincident graphic objects temporarily transparent.

28. The data processing system of claim 27, operable to make said outermost one of the coincident graphic objects reappear automatically after the graphics editing operation has been performed on said target graphic object.

* * * * *